United States Patent [19]

Vandenkieboom

[11] 4,009,968
[45] Mar. 1, 1977

[54] ELECTRICALLY DRIVEN TOOL COMPENSATOR

[75] Inventor: John Vandenkieboom, St. Clair Shores, Mich.

[73] Assignee: LaSalle Machine Tool, Inc., Warren, Mich.

[22] Filed: Nov. 28, 1975

[21] Appl. No.: 636,114

[52] U.S. Cl. .................................................. 408/12
[51] Int. Cl.² ........................................ B23B 47/20
[58] Field of Search ............... 408/8, 9, 10, 11, 12, 408/13

[56] References Cited

UNITED STATES PATENTS

| 3,640,633 | 2/1972 | Gersch | 408/12 |
| 3,740,161 | 6/1973 | Milewski | 408/12 X |

FOREIGN PATENTS OR APPLICATIONS

| 923,620 | 4/1963 | United Kingdom | 408/13 |

*Primary Examiner*—Gil Weidenfeld
*Attorney, Agent, or Firm*—Olsen and Stephenson

[57] ABSTRACT

Electrically operated apparatus for adjusting the working position of a machine tool to compensate for such conditions as tool wear by automatically maintaining a predetermined position of the tool within desired tolerance limits. In response to a signal from automatic gaging equipment indicating the necessity of moving the cutting tool either toward or away from the workpiece, a synchronous electrical motor drives tool compensating apparatus to provide for adjusted movement of the tool through a predetermined incremental distance. Limit switches determine the working and retracted positions of the tool and a movable slip ring which carries the limit switch actuator enables movement of the tool to adjusted working positions to compensate for tool wear.

10 Claims, 5 Drawing Figures

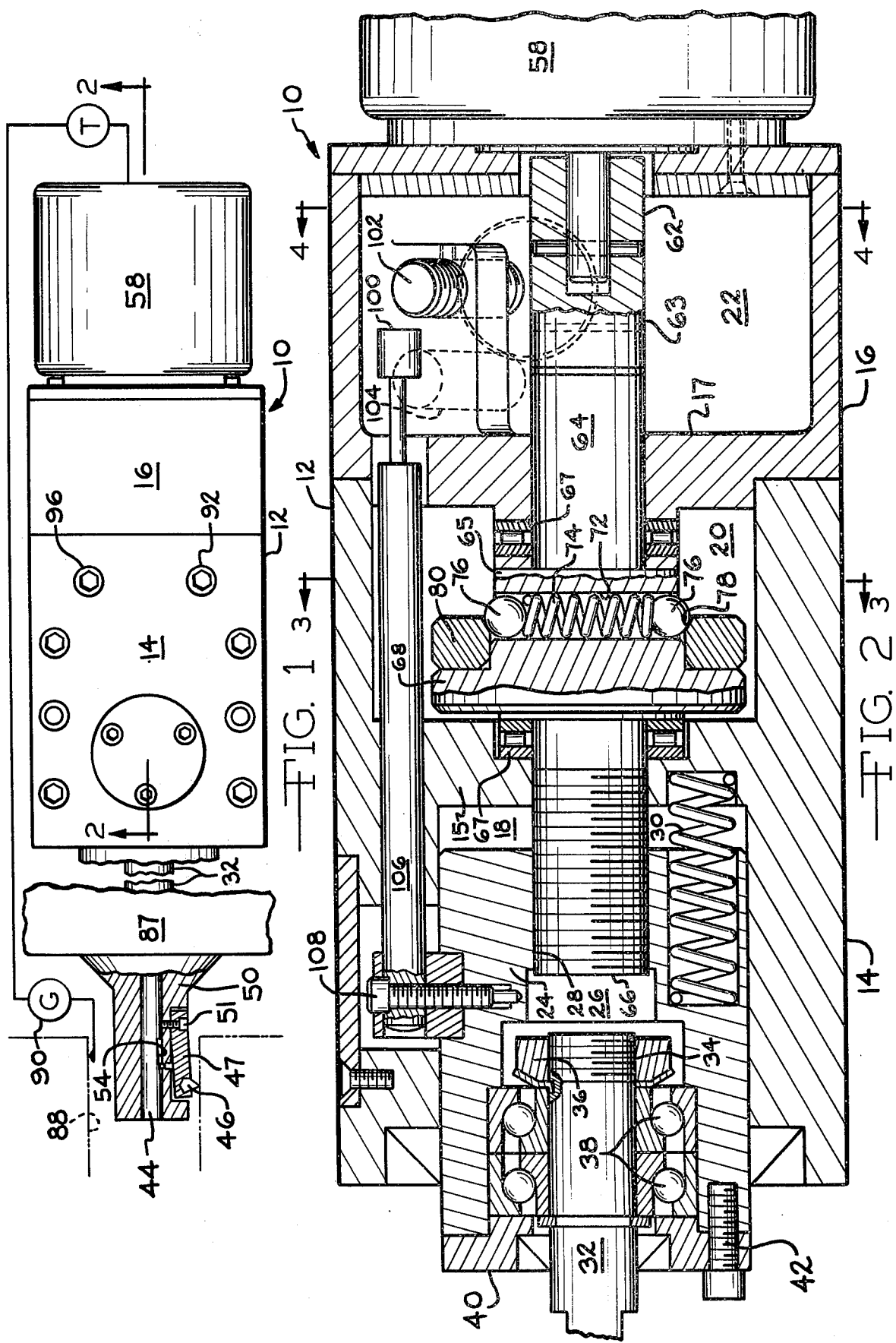

ELECTRICALLY DRIVEN TOOL COMPENSATOR

BACKGROUND OF THE INVENTION

In the machining of like parts, such as during a boring operation, the constant wear of the boring tool must be taken into account so as to maintain predetermined dimensions. Also, where conditions exist that cause variant temperatures in the area of the tool, adjustment of the position of the tool relative to the workpiece must be made to compensate for tool movement. Electrical apparatus has been previously developed to make the necessary adjustments. However, such apparatus usually requires complex AC-DC controls used in connection with an electric stepping motor to make the necessary changes in the position of the tool. Such equipment is relatively expensive and extensive maintenance is required to keep such sophisticated equipment running smoothly.

Summary of the Invention

In the improved tool compensating apparatus of this invention, electrically operated apparatus is provided for accurately moving a tool between "working" and "retract" positions, in combination with gaging equipment which signals a predetermined increment of tool travel each time tool adjustment is needed. The tool is movable radially outward and inward in response to axial movement of a draw bar. A synchronous electrical motor with a gear reducer drives a screw and nut assembly connected to the draw bar so that the draw bar is moved back and forth in directions determined by the direction of rotation of the motor. Automatic gaging equipment measures the machined workpiece. When either an oversize or an undersize condition exists, a signal is transmitted which actuates the synchronous electrical motor to begin turning the screw and thus moving the draw bar.

A control timer limits the operation of the motor to a length of time needed to move the tool a predetermined increment of travel. This adjustable movement of the tool will continue in cycles until the workpiece has been machined to dimensions within the specified tolerances. A slip ring, normally held in a stationary position on the screw by a spring and ball assembly, carries a limit switch actuator. A pair of limit switches, corresponding to the working and retract positions of the tool, cooperate with the actuator to cause the tool to automatically cycle between working and retract positions in response to motor operation. During operation of the motor in response to the gaging equipment to adjust the working position of the tool, the actuator overrides one of the limit switches and the slip ring slips on the screw. A stationary stop engages the switch actuator to insure the desired overriding.

In addition, a pair of limit switches are provided to limit adjustable movement of the nut in the screw and nut assembly so that the operator will always know that the nut is within a predetermined range of positions. The switches are actuated by an actuator mounted on the nut for movement therewith. The actuator, in cooperation with the limit switches, is operable to shut off the screw drive motor in response to movement of the nut to limit positions.

The slip ring also allows repositioning of the nut relative to the limit switches without changing the relationship of the tool compensator switches to the actuator therefor. Accordingly, the present invention provides accurate electrically controlled apparatus for moving a machine tool small incremental distances to compensate for tool wear and other conditions such as expansion and contraction due to varying temperatures while still enabling rapid cycling of the tool between accurately repeatable working and retract positions. These objectives are accomplished without requiring a special electric motor with expensive controls.

Further objects, features and advantages of this invention will become apparent from a consideration of the following description, the appended claims, and the accompanying drawing in which:

FIG. 1 is an elevational view of the tool compensating apparatus of the present invention with parts broken away and shown in section for the purpose of clarity;

FIG. 2 is an enlarged longitudinal sectional view of the apparatus taken at line 2—2 in FIG. 1;

Figure 3:
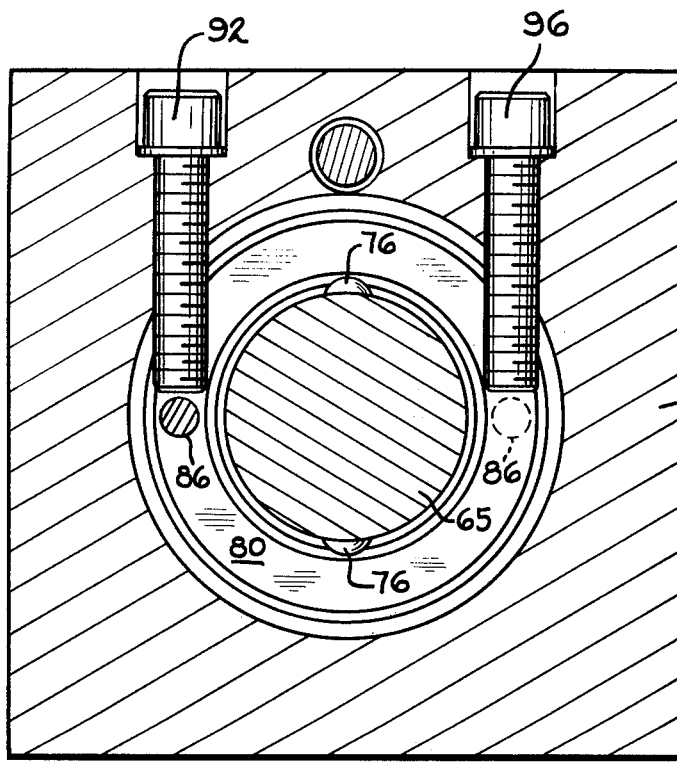
FIG. 3 is an enlarged transverse sectional view of the apparatus taken at line 3—3 in FIG. 2.

In the illustrated embodiment of the present invention, the tool compensation apparatus, shown generally at 10 in FIG. 1, comprises a hollow housing 12 having a main section 14 and an end or cap section 16 secured to the main section 14. A pair of internal partitions or walls 15 and 17 divide the interior of the housing 12 into a series of adjacent cavities 18, 20 and 22 (FIG. 2).

A nut 24, formed to a cylindrical shape and having an interior cavity 26 which communicates with a threaded opening 28 is slidably mounted within the housing cavity 18. A plurality of coil springs 30, only one of which is shown in FIG. 2, are located within the cavity 18 and are engaged with the nut 24. The coil springs 30 exert axial forces on the nut 24 to eliminate backlash due to thread tolerance.

A draw bar assembly 32 is removably affixed to the nut 24 so that it moves axially with the nut 24. A threaded end portion 34 of the draw bar 32 is mounted within the nut 24 by a locknut 36, and a pair of bearings 38 rotatably mount the draw bar 32 within the nut 24. A retainer 40, secured to the housing 12 by screws 42, cooperates with locknut 36 to provide secure mounting of draw bar 32 to nut 24.

A boring bar 44, as shown in FIG. 1, is conventionally secured to the draw bar 32 and is operable to provide for radially inward and outward movement of a cutting tool 46. The tool 46 is mounted on one end of a metal strip 47, the opposite end of which is secured to a tool support body 50 by means of a screw 51. A cam 54 on the boring bar 44 is operable in response to axial movement of the draw bar 32 in one direction to flex the strip 47 and thus move the tool 46 radially outwardly toward the workpiece.

When the draw bar 32 is moved in the opposite direction, the strip 47 flexes back to retract the tool 46 away from the workpiece. More specifically, movement of the draw bar 32 toward the right, as viewed in FIG. 1, is operable by virtue of the cam 54 to extend the tool 46 radially outwardly to its boring or working position. Movement of the draw bar 32 to the left, as viewed in FIG. 1, provides for movement of the tool 46 away from the workpiece to the retract position for the tool 46.

Referring back to FIG. 2, a conventional synchronous electric motor 58 has an output shaft 62 which is coaxial with the draw bar 32 and projects into housing cavity 22. The shaft 62 is secured to one end 63 of a screw member 64 which terminates at its opposite end in a threaded section 66 which is threaded into the opening 28 of the nut 24. Between its ends 63 and 66, the screw member 64 includes an enlarged portion 65 confined between thrust bearings 67. The portion 65 has a radially outwardly extending flange 68 which is located in the housing cavity 20 and arranged in a closely spaced relation with the housing wall 15. Adjacent the flange 68 the enlarged portion 65 is formed with a through hole 72 in which a coil spring 74 is located. The spring 74 exerts radially outwardly directed forces on a pair of balls 76 which project outwardly into engagement with the bevelled inner edge 78 of a slip ring 80 which encircles the screw assembly 64 and is in face-to-face engagement with the flange 68.

The balls 76 translate the compression force of the spring 74 into forces which maintain the slip ring 80 in frictional engagement with the flange 68. Thus, the slip ring 80 is rotatable with the flange 68 but relative movement between the flange 68 and the slip ring 80 can also be obtained by rotating the screw assembly 64 and restraining the slip ring 80.

Figure 5:
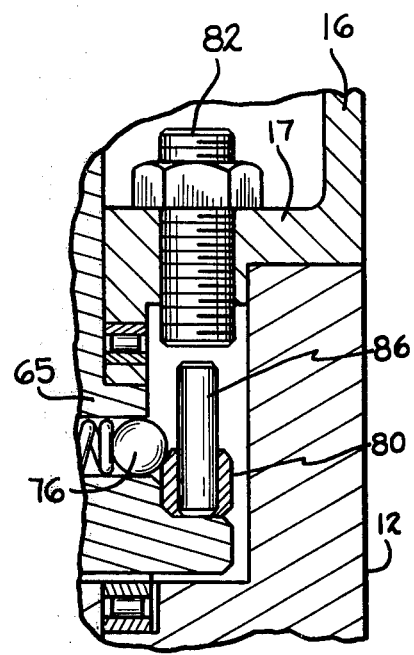
FIG. 5 is a detail sectional view of the apparatus, showing the slip ring mounted actuator of the invention in actuating position with respect to a limit switch, as seen from substantially the line 5—5 in FIG. 4.
Figure 4:
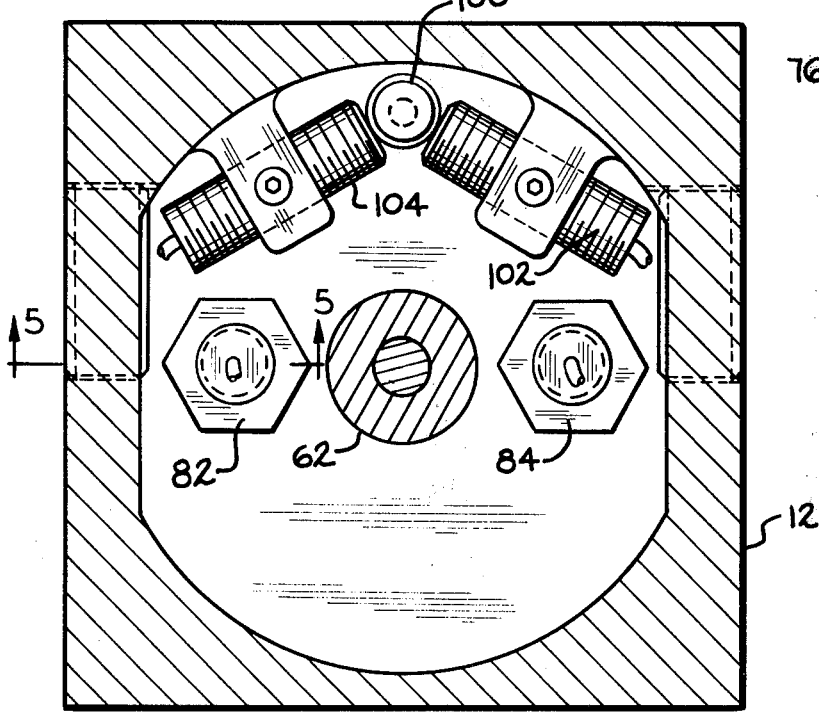
FIG. 4 is an enlarged transverse sectional view of the apparatus taken from the line 4—4 in FIG. 2.

A pair of proximity switches 82 and 84 are mounted on diametrically opposite portions of the housing end section 16 as shown in FIGS. 4 and 5. The proximity switches are conventional sensing devices capable of detecting magnetic objects that pass within a predetermined distance and which then develop a signal in response to such detection. Such pickups are commonly used to count metal objects, detect ferrous and non-ferrous metal, indicate rate and distance of travel, time operations sequentially, and also serve as limit controls. A switch actuator comprising a metal rod 86, capable of actuating the switches 82 and 84 when moved into a position close to being in axial alignment with a switch 82 or 84, is mounted on the slip ring 80 for movement therewith as shown in FIG. 5. The switches 82 and 84 are connected in circuit with the motor 58, in a conventional manner, so that the switches function as limit switches. For example, assume that the motor 58 is operating to rotate the screw 64 in a direction to move the draw bar 32 to the right, as viewed in FIG. 1. In turn, the tool 46 is moved radially outwardly toward its working position. When the switch actuator 86 reaches the position shown in FIG. 5 in which it is substantially aligned with the switch 82, a conventional circuit, connecting the switch 82 and the motor 58, provides for shutting off the motor to thereby determine the working position of the tool 46. The switch 82 is thus referred to as the working position limit switch.

Conversely, when the motor 58 has received a retract signal, causing the motor 58 to operate so as to move the draw bar 32 to the left as viewed in FIG. 1 and provide for retraction of the tool 46, the switch actuating member 86 is moved counter clockwise as viewed in FIG. 3. When the member 86 reaches a position substantially aligned with the switch 84, the motor 58 is shut off and the tool 46 is in a clearance position with the work so that the work and the tool can be moved away from each other without danger of the tool scoring the work. Thus, the position of the switch 84 determines the retract position of the tool 46. The switch 84 is, therefore, referred to as the retract limit switch.

In the use of the apparatus 10, assume that the tool support body 50 is being conventionally rotated about the axis of the draw bar 32 and boring bar 44, which are coaxial with each other and with screw 64, by a spindle 87. Rotation of body 50 is effective to drive tool 46 so as to bore the surface 88 shown in FIG. 1. During the machining of a plurality of surfaces 88, one after another, the motor 58 cooperates with the limit switches 82 and 84 to continuously cycle the tool 46 between working and retract positions. This enables the tool 46 to be used to machine workpiece surfaces, such as the surface indicated diagrammatically at 88 in FIG. 1, to uniform diameters since the limit switch 82 insures that the tool 46 will always be in the same radial position during machining. At the conclusion of each machining operation, the limit switch 84 insures that the tool 46 will be moved to a retract position in spaced relation with the surface 88 so that the tool 46 can be withdrawn from the surface 88 without leaving a score mark.

A gage, shown diagrammatically at 90 in FIG. 1, senses the location of the surface 88 and determines whether or not the surface 88 is oversize or undersize with respect to the pre-established tolerance limits. Assume that the gage 90 senses that the surface 88 is undersize because of wear of the tool 46, the most common condition. The gage 90 sends a signal to a timer circuit T connected thereto which signals the motor 58 to rotate the screw 64 so that the switch actuating member 86 is rotated in a clockwise direction, as viewed in FIG. 3, when the switch actuating member 86 is in the solid line position shown in FIG. 3. A set screw 92 carried by the housing 12 and adjustable therein is in position to engage the switch actuating member 86 to thereby prevent rotation of the slip ring 80 with the screw 64. The timer circuit T, which is a conventional circuit, provides for a shut off of the motor 58 after a predetermined time providing for movement of the tool 46 a predetermined incremental distance. This incremental movement of the tool 46 corresponds to a predetermined angular movement of the slip ring 80 in which the switch actuating member 86 is overriding the limit switch 82 to thus determine a new working position for the tool 46.

In the event the gage 90 senses an oversize surface 88 because of temperature conditions that have caused the tool 46 to be located radially outwardly a greater distance than allowable, the gage 90 operates through the timer circuit T to provide for operation of the motor 58 in a reverse direction when the switch actuating member 86 is adjacent the retract limit switch 84. In such case, the switch actuating member 86 engages the inner end of a set screw 96 which is adjustably mounted on the housing 12 so that the switch actuating member 86 overrides the limit switch 84. The actuating member 86 is shown in this position in broken lines in FIG. 3. This provides for location of the tool 46 in a new working position located radially inwardly from the previous working position. Thus, the gage 90 is capable of operating in conjunction with the timer circuit T so as to provide for adjustable movement of the tool 46 in increments both radially inwardly and outwardly to insure the machining of the surface 88 on a large number of workpieces to a uniform size.

Movement of the screw 64 to compensate for wear of the tool 46 is limited by an actuator 100 and a pair of proximity switches 102 and 104 (FIGS. 2 and 4). As shown in FIG. 2, a rod 106 is attached to the nut 24 by means of a mounting screw 108 extending through one end of the rod 106. The actuator 100 is mounted on the opposite end of the rod 106. The rod 106, and therefore the actuator 100, both move with the nut 24 in a direction parallel to the axis of the screw 64.

When the actuator 100 reaches a position close to being in vertical alignment with either of the switches 102 or 104 the motor 58 is automatically shut off. During rotation of the screw 64 to compensate for tool wear, the actuator 100 is moved to the right in FIG. 2 until it reaches a limit position substantially aligned with the switch 102, at which time further movement of the screw to compensate for tool wear is impossible because actuation of switch 102 prevents operation of motor 58. The tool 46 is then replaced and the motor 58 is operated in a reverse direction until a new working position is determined. When a new tool 46 is installed, the motor 58 is operated to position the nut 24 at a position corresponding to a position of the actuator 100 adjacent the switch 104. The limit switches 102 and 104 thus operate in conjunction with actuator 100 to keep the operator informed of the position of the nut 24.

From the above description, it is seen that this invention provides machine tool apparatus in which the tool 46 can be continuously cycled between working and retract positions with assurance that when the tool 46 is in the working position, it is always in the same position with respect to the axis of the screw 64 and the workpiece surface 88. As a result, uniformity of machining of surfaces 88 is insured. Tool compensation is achieved by a signal from a workpiece gage 90 and this signal provides for incremental adjustment of the position of the tool 46 to assure its constant location in the same working position. Conventionally, the gage 90 measures a workpiece bored by the tool 46 while the tool 46 is boring a subsequent workpiece.

The stationary stops 92 and 96 cooperate with the slip ring 80 to provide for adjustment of the switch actuating member 86 necessary to adjust the working position of the tool 46 to compensate for tool wear or the like. The apparatus 10 is thus an accurate mechanism for moving a machine tool in small incremental distances to compensate for tool wear and the like, while still enabling rapid cycling of the tool between accurately repeatable working and retract positions. This is accomplished with a conventional electric motor 58 which does not require the complex and expensive controls normally required for electric stepping motors. In addition, tool changes are automatically signaled and do not require extensive disassembly of the apparatus 10 by virtue of the use of the limit switches 102 and 104 and the nut mounted actuator 100.

It is claimed:

1. In machine tool adjusting apparatus for automatically extending and retracting a machine tool, reversible electric motor means, means interconnecting said tool with said motor means, said interconnecting means being operable to provide for adjusting movements of said tool in response to operation of said motor means, gaging means operable to detect the position of said tool and provide for operation of said motor means, and timer means having a preset time cycle operatively associated with said motor means for terminating motor means operation after operation thereof in response to said gaging means to move said tool through a preset increment of adjusting movement.

2. Apparatus according to claim 1 further including means providing for operation of said motor means to cycle said tool between an extended working position and a retracted position, said means including a pair of limit switches connected to said motor means and corresponding to said tool positions, and a switch actuator movable between said limit switches in response to operation of said motor means.

3. Apparatus according to claim 2 wherein said interconnecting means comprises a rotatable nut and screw assembly and said switch actuator is connected to said nut and screw assembly for rotation therewith.

4. Machine tool apparatus comprising a tool movable radially outwardly to a working position and radially inwardly to a retract position, an axially reciprocable draw bar operatively associated with said tool so that on movement of said draw bar in one direction said tool is moved toward said working position and on movement of said draw bar in the opposite direction said tool is moved toward said retract position, a reversible electric motor, a screw and nut assembly connecting said motor to said draw bar so that operation of said motor results in reciprocable movement of said draw bar, a pair of angularly spaced limit switches corresponding to said tool working and retract positions, and a switch actuating member on said screw and nut assembly rotatable through an angle corresponding to the angular spacing of said limit switches during movement of said tool between said working and retract positions whereby said motor is operable to move said tool between said working and retract positions under the control of said limit switches.

5. Apparatus according to claim 4 further including a slip ring rotatably mounted on said screw and nut assembly and supporting said switch actuating member, means frictionally maintaining said slip ring in a fixed position on said assembly, and stationary stop means operable to restrain rotation of said slip ring during rotation of said screw and nut assembly to thereby adjust the working and retract positions of said tool as determined by said limit switches.

6. Apparatus according to claim 5 further including gaging means operable to determine the radial position of said tool, and means operable to provide for operation of said motor for a pre-established time period in response to a predetermined determination of the radial position of said tool.

7. Apparatus according to claim 4 wherein said screw and nut assembly comprises a rotatable screw member connected to said motor and an axially movable nut threaded onto said screw member and connected to said draw bar, and a flange on said screw member, said slip ring being rotatably mounted on said screw member and frictionally engaged with said flange.

8. Apparatus according to claim 7 further including a compression spring on said screw member, and means engaged by said spring and positioned in engagement with said slip ring urging said slip ring into face-to-face frictional engagement with said flange.

9. Apparatus according to claim 7 further including a housing supporting said nut and screw assembly, said limit switches being mounted on said housing.

10. Apparatus according to claim 9 further including a switch operating member mounted on said nut for axial movement therewith and switch means mounted on said housing in a fixed position with respect to said screw member and operable in response to movement of said switch operating member to a predetermined position corresponding to the location of said nut in a predetermined limit position.

* * * * *